US008761407B2

(12) United States Patent
Brown et al.

(10) Patent No.: US 8,761,407 B2
(45) Date of Patent: Jun. 24, 2014

(54) METHOD FOR DETERMINING INVERSE FILTER FROM CRITICALLY BANDED IMPULSE RESPONSE DATA

(75) Inventors: C Phillip Brown, Castro Valley, CA (US); Per Ekstrand, Stockholm (SE); Alan Seefeldt, San Francisco, CA (US)

(73) Assignees: Dolby International AB, Amsterdam Zuid-oost (NL); Dolby Laboratories Licensing Corporation, San Francisco, CA (US)

(*) Notice: Subject to any disclaimer, the term of this patent is extended or adjusted under 35 U.S.C. 154(b) by 507 days.

(21) Appl. No.: 13/145,758

(22) PCT Filed: Jan. 13, 2010

(86) PCT No.: PCT/US2010/020846

§ 371 (c)(1), (2), (4) Date: Jul. 21, 2011

(87) PCT Pub. No.: WO2010/120394

PCT Pub. Date: Oct. 21, 2010

(65) Prior Publication Data

US 2011/0274281 A1 Nov. 10, 2011

Related U.S. Application Data

(60) Provisional application No. 61/148,565, filed on Jan. 30, 2009.

(51) Int. Cl.
*H04R 29/00* (2006.01)
*H04N 11/00* (2006.01)

(52) U.S. Cl.
USPC .................................. 381/58; 381/59; 381/56

(58) Field of Classification Search
USPC ............................................... 381/56, 58, 59
See application file for complete search history.

(56) References Cited

U.S. PATENT DOCUMENTS 5,384,856 A 1/1995 Kyouno
5,572,443 A 11/1996 Emoto (Continued)

FOREIGN PATENT DOCUMENTS

JP 2000-270392 9/2000
JP 2006-519406 8/2006

(Continued)

OTHER PUBLICATIONS

Hironori, Tokuno et al, "Inverse Filter of Sound Reproduction Systems Using Regularization", May 1997.*

(Continued)

*Primary Examiner* — Duc Nguyen
*Assistant Examiner* — George Monikang

(57) ABSTRACT

A method for determining an inverse filter for altering the frequency response of a loudspeaker so that with the inverse filter applied in the loudspeaker's signal path the inverse-filtered loudspeaker output has a target frequency response, and optionally also applying the inverse filter in the signal path, and a system configured (e.g., a general or special purpose processor programmed and configured) to determine an inverse filter. In some embodiments, the inverse filter corrects the magnitude of the loudspeaker's output. In other embodiments, the inverse filter corrects both the magnitude and phase of the loudspeaker's output. In some embodiments, the inverse filter is determined in the frequency domain by applying eigenfilter theory or minimizing a mean square error expression by solving a linear equation system.

29 Claims, 5 Drawing Sheets

(56) References Cited

U.S. PATENT DOCUMENTS

| | | | | |
|---|---|---|---|---|
| 5,699,480 | A | 12/1997 | Martin | |
| 6,167,417 | A | 12/2000 | Parra | |
| 6,275,592 | B1 | 8/2001 | Vartiainen | |
| 6,480,827 | B1 | 11/2002 | McDonald | |
| 6,954,530 | B2 | 10/2005 | Gunther | |
| 7,215,787 | B2 | 5/2007 | Sternad | |
| 7,315,815 | B1 | 1/2008 | Gersho | |
| 2004/0109570 | A1* | 6/2004 | Bharitkar et al. | 381/17 |
| 2005/0008169 | A1 | 1/2005 | Muren | |
| 2005/0080616 | A1 | 4/2005 | Leung | |
| 2005/0157891 | A1 | 7/2005 | Johansen | |
| 2005/0254662 | A1 | 11/2005 | Blank | |
| 2006/0056646 | A1 | 3/2006 | Bharitkar | |
| 2006/0067535 | A1* | 3/2006 | Culbert et al. | 381/58 |
| 2006/0147057 | A1 | 7/2006 | Aggarwal | |
| 2006/0171547 | A1 | 8/2006 | Lokki | |
| 2006/0262939 | A1 | 11/2006 | Buchner | |
| 2006/0262940 | A1 | 11/2006 | Asada | |
| 2007/0019826 | A1 | 1/2007 | Horbach | |
| 2007/0055508 | A1 | 3/2007 | Zhao | |
| 2007/0121955 | A1 | 5/2007 | Johnston | |
| 2008/0015845 | A1 | 1/2008 | Schmidt | |
| 2008/0025534 | A1 | 1/2008 | Kuhn | |
| 2008/0192957 | A1* | 8/2008 | Kubo | 381/103 |
| 2008/0285772 | A1 | 11/2008 | Haulick | |

FOREIGN PATENT DOCUMENTS

| | | |
|---|---|---|
| JP | 2007-282202 | 10/2007 |
| TW | 2000520589 | 6/2005 |
| WO | 9000851 | 1/1990 |
| WO | 0110102 | 2/2001 |
| WO | 03107719 | 12/2003 |
| WO | 2004/077884 | 9/2004 |
| WO | 2007112749 | 10/2007 |

OTHER PUBLICATIONS

Nakajima et al, U.S. Appl. No. 61/092,532.*
Ramos, et al., “Filter Design Method for Loudspeaker Equalization Baded on IIR Parametric Filters”, JAES AES New York, USA, vol. 54, No. 12, Dec. 1, 2006, pp. 1162-1178.
Norcross, et al., “Adaptive Strategies for Inverse Filtering” AES presented at the 119th Convention, Oct. 7-10, 2005, New York, New York, USA, pp. 1-5.
Norcross, et al., “Distortion Audibility in Inverse Filtering” AES presented at the 117th Convention, Oct. 28-31, 2004, San Francisco, CA USA, pp. 1-7.
Norcross, et al., “Evaluation of Inverse Filtering Techniques for Room/Speaker Equalization” AES presented at the 113th Convention, Oct. 5-8, 2002, Los Angeles, CA, USA, pp. 1-12.
Norcross, et al., “Further Investigations of Inverse Filtering” AES presented at the 115th Convention, Oct. 10-13, 2003, New York, New York, USA, pp. 1-11.
Norcross, et al., “Inverse Filtering Design Using a Minimal-Phase Target Function from Regularization” AES Convention Paper 6929, presented at the 121st Convention, Oct. 5-8, 2006, San Francisco CA, USA, pp. 1-8.
Norcross, et al., “Multichannel Inverse Filtering with Minimal-Phase Regularization” AES presented at the 123rd Convention, Oct. 5-8, 2007, New York, NY, USA, pp. 1-8.
Norcross, et al., “Subjective Effects of Regularization on Inverse Filtering” AES presented at the 114th Convention, Mar. 22-25, 2003, Amsterdam, the Netherlands, pp. 1-8.
Norcross, et al., “Subjective Investigations of Inverse Filtering” J. Audio Eng. Society, vol. 52, No. 10, Oct. 2004, pp. 1003-1028.
Kirkeby, et al., “Digital Filter Design for Inversion Problems in Sound Reproduction” J. Audio Engineering Society, vol. 47, No. 7/8, Jul./Aug. 1999, pp. 583-595.
Dyreby, et al., “Equalization of Loudspeaker Resonances Using Second-Order Filters Based on Spatially Distributed Impulse Response Measurements” AES, presented at the 123rd Convention, Oct. 5-8, 2007, New York, NY, USA, pp. 1-13.
Kim, et al., “Hybrid Equalization of Room for Home Theatre System” AES 115th Convention, Oct. 10-13, 2003, New York, NY, pp. 1-10.
Bharitkar, et al., “Comparison Between Time Delay Based and non-uniform Phase Based Equalization for Multi-Channel Loudspeaker-Room Responses” AES Convention Paper 6607, presented at the 119th Convention, Oct. 7-10, 2005, New York, NY USA, pp. 1-10.
Miyoshi, et al., “Inverse Filtering of Room Acoustics” IEEE Transactions on Acoustics, Speech and Signal Processing, published on Feb. 1988, vol. 36, Issue 2, pp. 145-152.
Kirkeby, et al., “Inverse Filtering in Sound Reproduction” published in Nov. 1993, vol. 26, issue: 9 pp. 261-266.
Yon, et al., “Sound Focusing in Rooms. II. The Spatio-Temporal Inverse Filter” J. Acoust. Soc. Am. published in Dec. 2003, pp. 3044-3052.
Usagawa, et al., “A Microphone Array System Using Iterative Echo Suppression Method as Inverse Filtering” Acoust. Sci. & Tech. 22, published Jul. 2001, pp. 315-317.
Wenndt, et al., “Blind Channel Estimation for Audio Signals” 2004 IEEE Aerospace Conference Proceedings, pp. 3144-3150.
Cobo, et al., “Measuring Short Impulse Responses with Inverse Filtered Maximum-Length Sequences” Applied Acoustics, vol. 68, Issue 7, Jul. 2007, pp. 820-830.
Gao, et al., “Adaptive Linearization of a Loudspeaker”, presented at the AES 93rd Convention Oct. 1-4, 1992 San Francisco.
Salamouris, et al., “Digital System for Loudspeaker and Room Equalization” AES presented at the 98th Convention Feb. 25-28, 1995 Paris.
Genereux, Ronald, “Adaptive Filters for Loudspeakers and Rooms” presented at the AES 93rd Convention Oct. 1-4, 1992 San Francisco, CA, USA.
Ortega, et al., “Acoustic Feedback Cancellation in Speech Reinforcement Systems for Vehicles” Interspeech 2005 in Lisbon, Portugal, Sep. 4-8, 2005.
Airas, Matti, “TKK Aparat: An Environment for Voice Inverse Filtering and Parameterization” 2008, vol. 33, No. 1, pp. 49-64.
Horiuchi, et al., “Adaptive Estimation of Transfer Functions for Sound Localization Using Stereo Earphone-Microphone Combination” IEICE Transactions on Fundamentals of Electronics, Communications and Computer Sciences, vol. E85-A, No. 8, pp. 1841-1850 published in Aug. 2002.
Marques, et al., “A Novel IIR Equalizer for Non-Minimum Phase Loudspeaker Systems” AES Convention Paper 6953, presented at the 121st Convention Oct. 5-8, 2006, San Francisco, CA USA.
Bouchard, Martin, “Inverse Structure for Active Noise Control and Combined Active Noise Control/Sound Reproduction Systems” IEEE Transactions on Speech and Audio Processing, vol. 9, No. 2, Feb. 2001, pp. 141-151.
Irisawa, et al., “Study of a Fast Method to Calculate Inverse Filters” J. Audio Engineering Society, vol. 46, No. 7/8, Jul./Aug. 1998, pp. 611-620.
Bai, et al., “Comparative Study of Audio Spatializers for Dual-Loudspeaker Mobile Phones” Journal of the Acoustical Society of America, Jan. 2007 v. 121, pp. 298-309.
Corteel, E., “Synthesis of Directional Sources Using Wave Field Synthesis, Possibilities, and Limitations” EURASIP Journal on Advances in Signal Processing, vol. 2007, 18 pages.
Boukis, et al., “Toward Bias Minimization in Acoustic Feedback Cancellation Systems” Journal of the Acoustical Society of America, Mar. 2007, v. 121, No. 3, p. 1529-1537.
Corteel, E., “Equalization in an Extended Area Using Multichannel Inversion and Wave Field Synthesis” J. Audio Eng. Soc., vol. 54, No. 12, Dec. 2006, pp. 1140-1161.
Norcross, et al., “Computational Load Reduction of Fast Convergence Algorithms for Multichannel Active Noise Control” Journal Signal Processing, published in Jan. 2003, vol. 83, Issue 1.
Norcross, “Aspects of Inverse Filtering for Loudspeakers” Canadian Acoustics Conference Title, Canada, vol. 32, No. 3, published in Sep. 2004, pp. 156-157.

(56) References Cited

OTHER PUBLICATIONS

Causse, et al., "Perceptual Evaluation of a Programmable Radiation Pattern Loudspeaker Simulating a Real Instrument" J. Acoustical Society of America, vol. 95, Issue 5, pp. 2959-2960 (1994).

Japanese Patent Application Publication No. 2000-270392, published Sep. 29, 2000, filed Mar. 15, 1999 (with English translation of the Abstract).

* cited by examiner

METHOD FOR DETERMINING INVERSE FILTER FROM CRITICALLY BANDED IMPULSE RESPONSE DATA

CROSS-REFERENCE TO RELATED APPLICATIONS

This application claims priority to U.S. Patent Provisional Application No. 61/148,565, filed 30 Jan. 2009, hereby incorporated by reference in its entirety.

BACKGROUND OF THE INVENTION

1. Field of the Invention

The invention relates to methods and systems for determining an inverse filter for altering a loudspeaker's frequency response in an effort to match the output of the inverse-filtered loudspeaker to a target frequency response. In typical embodiments, the invention is a method for determining such an inverse filter from measured, critically banded data indicative of the loudspeaker's impulse response in each of a number of critical frequency bands.

2. Background of the Invention

Throughout this disclosure including in the claims, the expression "critical frequency bands" (of a full frequency range of a set of one or more audio signals) denotes frequency bands of the full frequency range that are determined in accordance with perceptually motivated considerations. Typically, critical frequency bands that partition an audible frequency range have width that increases with frequency across the audible frequency range.

Throughout this disclosure including in the claims, the expression "critically banded" data (indicative of audio having a full frequency range) implies that the full frequency range includes critical frequency bands (e.g., is partitioned into critical frequency bands), and denotes that the data comprises subsets, each of the subsets consisting of data indicative of audio content in a different one of the critical frequency bands.

Throughout this disclosure including in the claims, the expression performing an operation (e.g., filtering or transforming) "on" signals or data is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that determines an inverse filter may be referred to as an inverse filter system, and a system including such a subsystem (e.g., a system including a loudspeaker and means for applying the inverse filter in the loudspeaker's signal path, as well as the subsystem that determines the inverse filter) may also be referred to as an inverse filter system.

Throughout this disclosure including in the claims, the expression "reproduction" of signals by speakers denotes causing the speakers to produce sound in response to the signals, including by performing any required amplification and/or other processing of the signals.

Inverse filtering is performed to improve the listening impression of one listening to the output of a loudspeaker (or set of loudspeakers), by canceling or reducing imperfections in an electro-acoustic system. By introducing an inverse filter in the loudspeaker's signal path, a frequency response that is approximately flat (or has another desired or "target" shape) and a phase response that is linear (or has other desired characteristics) may be obtained. An inverse filter can eliminate sharp transducer resonances and other irregularities in the frequency response. It can also improve transients and spatial localization. In traditional techniques, graphic or parametric equalizers have been used to correct the magnitude of loudspeaker acoustic output, while introducing their own phase characteristics on top of the preexisting loudspeaker phase characteristics. More recent methods implement deconvolution or inverse filtering which allows for correction of both finer frequency resolution as well as phase response. Inverse filtering methods commonly use techniques such as smoothing and regularization to reduce unwanted or unexpected side effects resulting from application of the inverse filter to the acoustic system.

A typical loudspeaker impulse response has large differences between the maxima and minima (sharp peaks and dips). If the loudspeaker response is measured at a single point in space, the resulting inverse filter will only flatten the response for that one point. Noise or small inaccuracies in the impulse response measurement may then result in severe distortion in a fully inverse filtered system. To avoid this situation, multiple spatial measurements are taken. Averaging these measurements prior to optimizing the inverse filter results in a spatially averaged response.

It is crucial to apply inverse filtering moderately so that loudspeakers are not driven outside their linear range of operation. An overall limit on the amount of correction applied is considered a global regularization.

To avoid dramatic or narrow compensation it is possible to use frequency dependent regularization in the computations, or otherwise perform frequency-dependent weighting of values generated during the computations (e.g., to avoid compensating for deep notches where it would be undesirable to do so). For example, U.S. Pat. No. 7,215,787, issued May 8, 2007, describes a method for designing a digital audio precompensation filter for a loudspeaker. The filter is designed to apply precompensation with frequency-dependent weighting. The reference suggests that the weighting can reduce the precompensation applied in frequency regions where the measuring and modeling of the loudspeaker's frequency response is subject to greater error, or can be perceptual weighting which reduces the precompensation applied in frequency regions where the listener's ears are less sensitive.

Until the present invention, it had not been known how to implement critical band smoothing efficiently during inverse filter determination. For example, it had not been known how to implement a method for determining an inverse filter for a loudspeaker in which critical band smoothing is performed on the speaker's measured impulse response during an analysis stage of the inverse filter determination, and the inverse of such critical band smoothing is performed during a synthesis stage of the inverse filter determination on banded filter values to generate inverse filtered values that determine the inverse filter.

Nor had it been known until the present invention how to perform inverse filter determination efficiently, including by applying eigenfilter theory (e.g., including by expressing stop band and pass band errors as Rayleigh quotients), or by minimizing a mean square error expression by solving a linear equation system.

BRIEF DESCRIPTION OF THE INVENTION

In a class of embodiments, the invention is a perceptually motivated method that determines an inverse filter for altering a loudspeaker's frequency response in an effort to match the inverse-filtered output of the loudspeaker (with the inverse filter applied in the signal path of the loudspeaker) to a target frequency response. In preferred embodiments, the inverse filter is a finite impulse response ("FIR") filter. Alternatively, it is another type of filter (for example, an IIR filter or a filter implemented with analog circuitry). Optionally, the method also includes a step of applying the inverse filter in the loudspeaker's signal path (e.g., inverse filtering the input to the speaker). The target frequency response may be flat or may have some other predetermined shape. In some embodiments, the inverse filter corrects the magnitude of the loudspeaker's output. In other embodiments, the inverse filter corrects both the magnitude and phase of the loudspeaker's output.

In preferred embodiments, the inventive method for determining an inverse filter for a loudspeaker includes steps of measuring the impulse response of the loudspeaker at each of a number of different spatial locations, time-aligning and averaging the measured impulse responses to determine an averaged impulse response, and using critical frequency band smoothing to determine the inverse filter from the averaged impulse response and a target frequency response. For example, critical frequency band smoothing may be applied to the averaged impulse response and optionally also to the target frequency response during determination of the inverse filter, or may be applied to determine the target frequency response. Measurement of the impulse response at multiple spatial locations can ensure that the speaker's frequency response is determined for a variety of listening positions. In some embodiments, the time-aligning of the measured impulse responses is performed using real cepstrum and minimum phase reconstruction techniques.

In some embodiments, the averaged impulse response is converted to the frequency domain via the Discrete Fourier Transform (DFT) or another time domain-to-frequency domain transform. The resulting frequency components are indicative of the measured averaged impulse response. These frequency components, in each of the k transform bins (where k is typically 256 or 512), are combined into frequency domain data in a smaller number b of critical frequency bands (e.g., b=20 bands or b=40 bands). The banding of the averaged impulse response data into critically banded data should mimic the frequency resolution of the human auditory system. The banding is typically performed by weighting the frequency components in the transform frequency bins by applying appropriate critical banding filters thereto (typically, a different filter is applied for each critical frequency band) and generating a frequency component for each of the critical frequency bands by summing the weighted data for said band. Typically, these filters exhibit an approximately rounded exponential shape and are spaced uniformly on the Equivalent Rectangular Bandwidth (ERB) scale. The spacing and overlap in frequency of the critical frequency bands provide a degree of regularization of the measured impulse response that is commensurate with the capabilities of the human auditory system. Application of the critical band filters is an example of critical band smoothing (the critical band filters typically smooth out irregularities of the impulse response that are not perceptually relevant so that the determined inverse filter does not need to spend resources correcting these details).

Alternatively, the averaged impulse response data are smoothed in another manner to remove frequency detail that is not perceptually relevant. For example, the frequency components of the averaged impulse response in critical frequency bands to which the ear is relatively less sensitive may be smoothed, and the frequency components of the averaged impulse response in critical frequency bands to which the ear is relatively more sensitive are not smoothed.

In other embodiments, critical banding filters are applied to the target frequency response (to smooth out irregularities thereof that are not perceptually relevant) or the target frequency response is smoothed (e.g., subjected to critical band smoothing) in another manner to remove frequency detail that is not perceptually relevant, or the target frequency response is determined using critical band smoothing.

Values for determining the inverse filter are determined from the target response and averaged impulse response (e.g., from smoothed versions thereof) in frequency windows (e.g., critical frequency bands). When values for determining the inverse filter are determined from the averaged impulse response (which has undergone critical band smoothing) and the target response in critical frequency bands (during an analysis stage of the inverse filter determination), these values undergo the inverse of the critical band smoothing (during a synthesis stage of the inverse filter determination) to generate inverse filtered values that determine the inverse filter. Typically, there are b values (one for each of b critical frequency bands), and the inverses of the above-mentioned critical banding filters are applied to the b values to generate k inverse filtered values (where k is greater than b), one for each of k frequency bins. In some cases, the inverse filtered values are the inverse filter. In other cases, the inverse filtered values undergo subsequent processing (e.g., local and/or global regularization) to determine processed values that determine the inverse filter.

The low frequency cut-off of the speaker's frequency response (typically, the −3 dB point) is typically also determined (typically from the critically banded impulse response data following the critical band grouping). It is useful to determine this cut-off for use in determining the inverse filter, so that the inverse filter does not try to over-compensate for frequencies below the cut-off and drive the speaker into nonlinearity.

The critically banded impulse response data are used to find an inverse filter which achieves a desired target response. The target response may be "flat" meaning that it is a uniform frequency response, or it may have other characteristics, such as a slight roll-off at high frequencies. The target response may change depending on the loudspeaker parameters as well as the use case.

Typically, the low frequency cut-off of the inverse filter and target response are adjusted to match the previously determined low frequency cut-off of the speaker's measured response. Also, other local regularization may be performed on various critical bands of the inverse filter to compensate for spectral components.

In order to maintain equal loudness when using the inverse filter, the inverse filter is preferably normalized against a reference signal (e.g., pink noise) whose spectrum is representative of common sounds. The overall gain of the inverse filter is adjusted so that a weighted rms measure (e.g., the well known weighted power parameter LeqC) of the inverse filter applied to the original impulse response applied to the reference signal is equal to the same weighted rms measure of the original impulse response applied to the reference signal. This normalization ensures that when the inverse filter is applied to most audio signals, the perceived loudness of the audio does not shift.

Typically also, the overall maximum gain is limited to or by a predetermined amount. This global regularization is used to ensure that the speaker is never driven too hard in any band.

Optionally, a frequency-to-time domain transform (e.g., the inverse of the transform applied to the averaged impulse response to generate the frequency domain average impulse response data) is applied to the inverse filter to obtain a time-domain inverse filter. This is useful when no frequency-domain processing occurs in the actual application of the inverse filter.

In other embodiments, the inverse filter coefficients are directly calculated in the time domain. The design goals, however, are formulated in the frequency domain with an objective to minimize an error expression (e.g., a mean square error expression). Initially, steps of measuring the speaker's impulse responses at multiple locations, and time aligning and averaging the measured impulse responses are performed (e.g., in the same manner as in embodiments described herein in which the inverse filter coefficients are determined by frequency domain calculations). The averaged impulse response is optionally windowed and smoothed to remove unnecessary frequency detail (e.g., bandpass filtered versions of the averaged impulse response are determined in different frequency windows and selectively smoothed, so that the smoothed, bandpass filtered versions determine a smoothed version of the averaged impulse response). For example, the averaged impulse response may be smoothed in critical frequency bands to which the ear is relatively less sensitive, but not smoothed (or subjected to less smoothing) in critical frequency bands to which the ear is relatively more sensitive. Optionally also, the target response is windowed and smoothed to remove unnecessary frequency detail, and/or values for determining the inverse filter are determined in windows and smoothed to remove unnecessary frequency detail. To minimize an error (e.g., mean square error) between the target response and the averaged (and optionally smoothed) impulse response, typical embodiments of the inventive method employ either one of two algorithms. The first algorithm implements eigenfilter design theory and the other minimizes a mean square error expression by solving a linear equation system.

The first algorithm applies eigenfilter theory (e.g., including by expressing stop band and pass band errors as Rayleigh quotients) to determine the inverse filter, including by implementing eigenfilter theory to formulate and minimize an error function determined from the target response and measured averaged impulse response of the loudspeaker. For example, the coefficients g(n) of the inverse filter can be determined by minimizing an expression for total error (by determining the minimum eigenvalue of a matrix P), said expression for total error having the following form:

$$\begin{aligned}\varepsilon_t &= (1-\alpha)\varepsilon_p + \alpha\varepsilon_s \\ &= (1-\alpha)\frac{g^T P_p g}{g^T g} + \alpha\frac{g^T P_s g}{g^T g} \\ &= \frac{g^T[(1-\alpha)P_p + \alpha P_s]g}{g^T g} \\ &= \frac{g^T P g}{g^T g},\end{aligned}$$

where the matrix P is the composite system matrix including the pass band and stop band constraints, the matrix g determines the inverse filter, and α weights a stop band error $\epsilon_s$ against a pass band error $\epsilon_p$;

The second algorithm preferably employs closed form expressions to determine frequency segments (e.g., equal-width frequency bands, or critical frequency bands) of the full range of the inverse filter. For example, closed form expressions are employed for a weighting function W(ω) and a zero phase function $P_R(\omega)$ in a total error function, $$E_{MSE} = \frac{1}{2\pi}\int_0^{2\pi} W(\omega)\left|P(e^{j\omega}) - H(e^{j\omega})G(e^{j\omega})^2\right| d\omega,$$

that is minimized to determine coefficients g(n) of the inverse filter, where the target frequency response is $P(e^{j\omega}) = P_R(\omega)e^{-j\omega g_d}$, $g_d$ is the desired group delay, frequency coefficients $H(e^{j\omega})$ determine the Fourier transform of the averaged impulse response h(n), and frequency coefficients $G(e^{j\omega})$ determine the Fourier transform of the inverse filter, and the error function satisfies $$E_{MSE} = \sum_k \varepsilon^{(k)}(\omega_l, \omega_u),$$

where the full frequency range of the loudspeaker is divided into k ranges (each from a lower frequency to $\omega_l$ to an upper frequency $\omega_u$) and the error function for each range is $$\varepsilon(\omega_l, \omega_u) = \frac{1}{\pi}\int_{\omega_l}^{\omega_u} W(\omega)\left|P(e^{j\omega}) - H(e^{j\omega})G(e^{j\omega})^2\right| d\omega.$$

Embodiments of the inventive method that determine an inverse filter in the time domain typically implement at least some of the following features:

there is an adjustable group delay in an error expression that is minimized to determine the inverse filter;

the inverse filter can be designed so that the inverse-filtered response of the loudspeaker has either linear or minimum phase. While linear phase compensation may result in noticeable pre-ringing for transient signals, in some cases linear phase behavior may be desired to produce a desired stereo image;

regularization is applied. Global regularization can be applied to stabilize computations and/or penalize large gains in the inverse filter. Frequency dependent regularization can also be applied to penalize gains in arbitrary frequency ranges; and the method for determining the inverse filter can be implemented either to perform all pass processing of arbitrary frequency ranges (so that the inverse filter implements phase equalization only for chosen frequency ranges) or pass-through processing of arbitrary frequency ranges (so that the inverse filter neither equalizes magnitude nor phase for chosen frequency ranges).

Some embodiments of the inventive method that determine an inverse filter in the time domain, and some embodiments that determine an inverse filter in the frequency domain, implement all or some of the following features:

critical frequency band smoothing (of the measured averaged impulse response) is implemented to obtain a well behaved filter response. For example, critical band filters can smooth out irregularities of the measured average impulse response that are not perceptually relevant so that the determined inverse filter does not spend resources correcting these details. This can allow the inverse filter to exhibit no huge peaks or dips while being useful to correct the speaker's frequency response selectively, only where the ear is sensitive;

regularization is performed on a critical frequency band-by-critical frequency band basis (rather than a transform bin-by-bin basis); and equal loudness compensation is implemented (e.g., to adjust the overall gain of the inverse filter so that a weighted rms measure of the inverse filter applied to the original impulse response applied to a reference signal is equal to the same weighted rms measure of the original impulse response applied to the reference signal). This equal loudness compensation is a kind of normalization that can ensure that when the inverse filter is applied to most audio signals, the perceived loudness of the audio does not shift.

In typical embodiments, the inventive system for determining an inverse filter is or includes a general or special purpose processor programmed with software (or firmware) and/or otherwise configured to perform an embodiment of the inventive method. In some embodiments, the inventive system is a general purpose processor, coupled to receive input data indicative of the target response and the measured impulse response of a loudspeaker, and programmed (with appropriate software) to generate output data indicative of the inverse filter in response to the input data by performing an embodiment of the inventive method.

Aspects of the invention include a system configured (e.g., programmed) to perform any embodiment of the inventive method, and a computer readable medium (e.g., a disc) which stores code for implementing any embodiment of the inventive method.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system, method, and medium will be described with reference to FIGS. 1-9.

Figure 1:
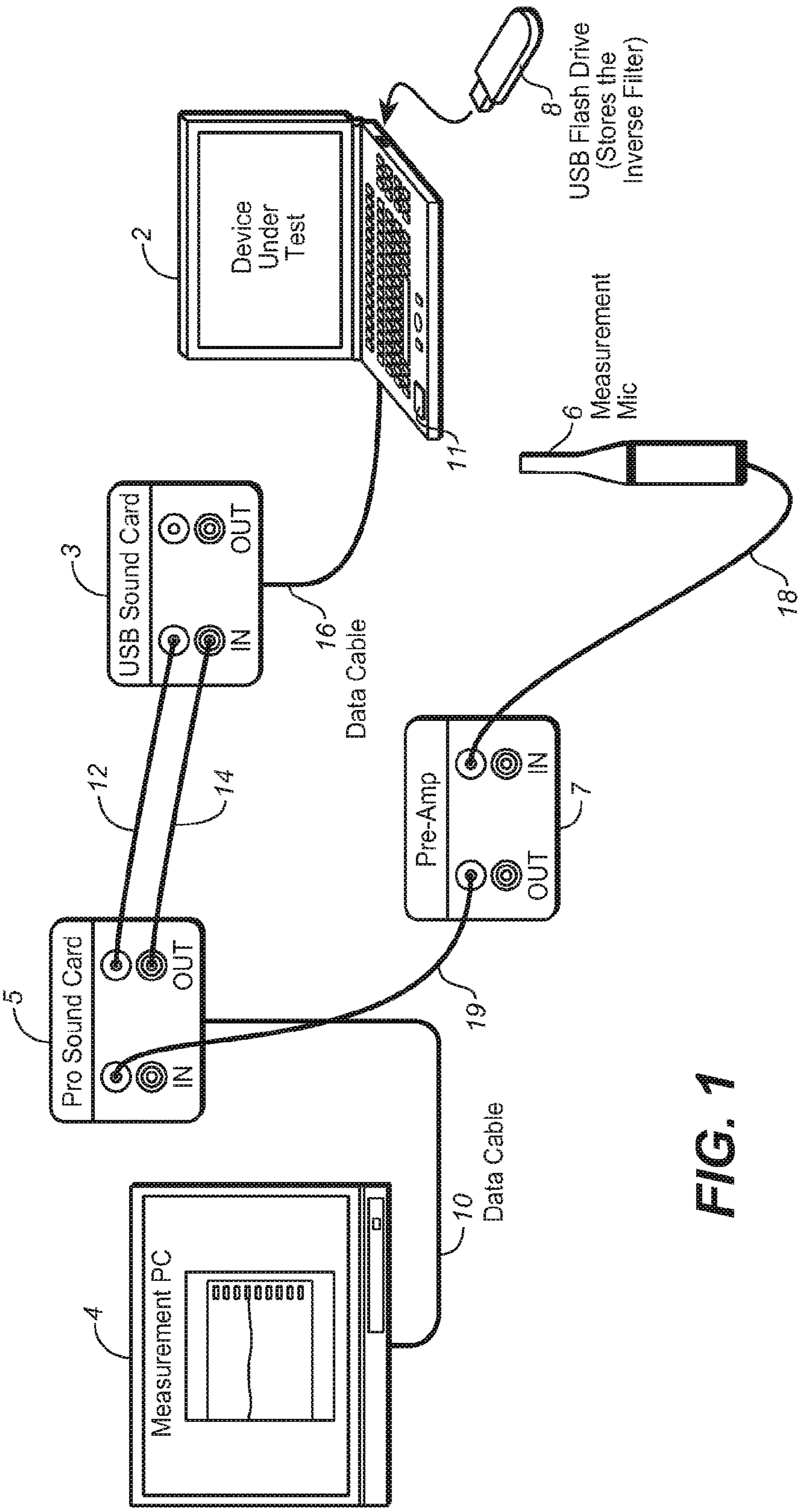
FIG. 1 is a schematic diagram of an embodiment of a system for determining an inverse filter in accordance with the invention.

FIG. 1 is a schematic diagram of an embodiment of a system for determining an inverse filter in accordance with the invention. The FIG. 1 system includes computers 2 and 4, sound card 5 (coupled to computer 4 by data cable 10), sound card 3 (coupled to computer 2 by data cable 16), audio cables 12 and 14 coupled between outputs of sound card 5 and inputs of sound card 3, microphone 6, preamplifier (preamp) 7, audio cable 18 (coupled between microphone 6 and an input of preamp 7), and audio cable 19 (coupled between an output of preamp 7 and an input of sound card 5). In typical embodiments, the system can be operated to measure the impulse response of a loudspeaker (e.g., loudspeaker 11 of computer 2 of FIG. 1) at each of a number of different spatial locations relative to the loudspeaker, and to determine an inverse filter for the loudspeaker. With reference to FIG. 1, in a typical implementation the measurement is done by asserting an audio signal (e.g., an impulse signal, or more typically, a sine sweep or a pseudo random noise signal) to the speaker and measuring the speaker's response as follows at each location.

With microphone 6 positioned at a first location relative to speaker 11, computer 4 generates data indicative of the audio signal and asserts the data via cable 10 to sound card 5. Sound card 5 asserts the audio signal over audio cables 12 and 14 to sound card 3. In response, sound card 3 asserts data indicative of the audio signal via data cable 16 to computer 2. In response, computer 2 causes loudspeaker 11 to reproduce the audio signal. Microphone 6 measures the sound emitted by speaker 11 in response (i.e., microphone 6 measures the impulse response of speaker 11 at the first location) and the amplified audio output of microphone 6 is asserted from preamp 7 to card 5. In response, sound card 5 performs analog to digital conversion on the amplified audio to generate impulse response data indicative of the impulse response of speaker 11 at the first location, and asserts the data to computer 4.

The steps described in the previous paragraph are then performed with microphone 6 repositioned at a different location relative to speaker 11 to generate a new set of impulse response data indicative of the impulse response of speaker 11 at the new location, and the new set of impulse response data is asserted from card 5 to computer 4. Typically, several repetitions of all these steps are performed, each time to assert to computer 4 a different set of impulse response data indicative of the impulse response of speaker 11 at a different location relative to speaker 11.

Figure 2:
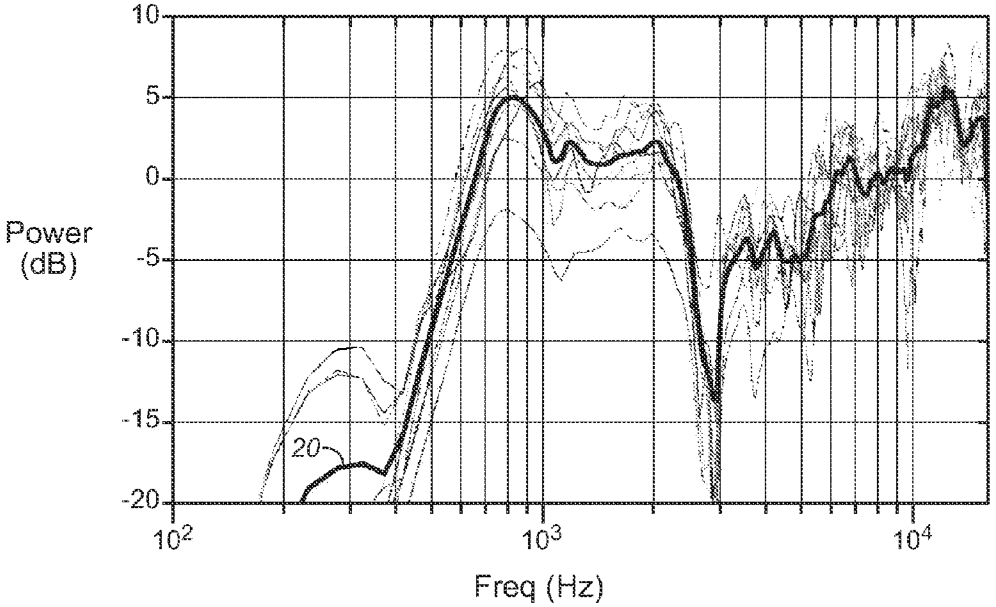
FIG. 2 is a graph of the frequency response of each of several measured impulse responses of the same loudspeaker (i.e., each graphed frequency response is a frequency domain representation of one of the measured, time-domain impulse responses), each measured with the loudspeaker driven by the same impulse at a different spatial position relative to the loudspeaker.

FIG. 2 is a graph of the frequency response of each of several measured impulse responses of the same loudspeaker (i.e., each graphed frequency response is a frequency domain representation of one of the measured, time-domain impulse responses), each measured with the loudspeaker driven by the same impulse at different a spatial position relative to the loudspeaker.

Computer 4 time-aligns and averages all the sets of measured impulse responses to generate data indicative of an averaged impulse response of speaker 11 (the impulse response of speaker 11 averaged over all the locations of the microphone), and uses this averaged impulse response data to perform an embodiment of the inventive method to determine an inverse filter for altering the frequency response of loudspeaker 11. Alternatively, the averaged impulse response data are employed by a system or device other than computer 4 to determine the inverse filter.

Curve 20 of FIG. 2 (and FIG. 3) is a graph of the frequency response of the averaged impulse response of speaker 11 (determined by computer 4), averaged over all the locations of the microphone (i.e., averaged frequency response 20 is a frequency domain representation of the time-domain averaged impulse response of speaker 11).

Computer 4 and other elements of the FIG. 1 system can implement any of a variety of impulse response measurement techniques (e.g., MLS correlation analysis, time delay spectrometry, linear/logarithmic sine sweeps, dual FFT techniques, and other conventional techniques) to generate the measured impulse response data, and to generate the averaged impulse response data in response to the measured impulse response data.

The inverse filter is determined such that, with the inverse filter applied in the signal path of loudspeaker 11, the inverse-filtered output of the loudspeaker has a target frequency response. The target frequency response may be flat or may have some predetermined shape. In some embodiments, the inverse filter corrects the magnitude of loudspeaker 11's output. In other embodiments, the inverse filter corrects both the magnitude and phase of loudspeaker 11's output.

In a class of embodiments, computer 4 is programmed and otherwise configured to perform a time-to-frequency domain transform (e.g., a Discrete Fourier Transform) on the averaged impulse response data to generate frequency components, in each of the k transform bins (where k is typically 512 or 256), that are indicative of the measured averaged impulse response. Computer 4 combines these frequency components to generate critically banded data. The critically banded data are frequency domain data indicative of the averaged impulse response in each of b critical frequency bands, where b is a smaller number than k (e.g., b=20 bands or b=40 bands). Computer 4 is programmed and otherwise configured to perform an embodiment of the inventive method to determine the inverse filter (in the frequency domain) in response to frequency domain data indicative of the target frequency response ("target response data") and the critically banded data.

In another class of embodiments, computer 4 is programmed and otherwise configured to perform an embodiment of the inventive method to determine the inverse filter (in the time domain) in response to time domain data indicative of the target frequency response (time domain "target response data") and the averaged impulse response data, without explicitly performing a time-to-frequency domain transform on the averaged impulse response data. In some embodiments in this class, computer 4 generates critically banded data in response to the averaged impulse response data (e.g., by appropriately filtering the averaged impulse response data), and determines the inverse filter in response to the target response data and the critically banded data. In this context, the critically banded data are time domain data indicative of the averaged impulse response in each of a number of critical frequency bands (e.g., 20 or 40 critical frequency bands).

Computer 4 typically determines values for determining the inverse filter from the target response and averaged impulse response (e.g., from smoothed versions thereof) in frequency windows (e.g., critical frequency bands). For example, when b values for determining the inverse filter (one value for each of b critical frequency bands) have been determined from the averaged impulse response data (which has undergone critical band smoothing) and the target response (during an analysis stage of the inverse filter determination), computer 4 performs on these values the inverse of the critical band smoothing (during a synthesis stage of the inverse filter determination) to generate inverse filtered values that determine the inverse filter. In this example, the inverses of the above-mentioned critical banding filters are applied to the b values to generate k inverse filtered values (where k is greater than b), one for each of k frequency bins. In some cases, the inverse filtered values are the inverse filter. In other cases, the inverse filtered values undergo subsequent processing (e.g., local and/or global regularization) to determine processed values that determine the inverse filter.

In other embodiments in this class, computer 4 does not generate critically banded data in response to the averaged impulse response data, but determines the inverse filter in response to the target response data and the averaged impulse response data (e.g., by performing one of the time-domain methods described hereinbelow).

After determining the inverse filter, computer 4 stores data indicative of the inverse filter (e.g., inverse filter coefficients) in a memory (e.g., USB flash drive 8 of FIG. 1), The inverse filter data can be read by computer 2 (e.g., computer 2 reads the inverse filter data from drive 8), and used by computer 2 (or a sound card coupled thereto) to apply the inverse filter in the signal path of loudspeaker 11. Alternatively, the inverse filter data are otherwise transferred from computer 4 to computer 2 (or a sound card coupled to computer 2), and computer 2 (and/or a sound card coupled thereto) apply the inverse filter in the signal path of loudspeaker 11.

For example, the inverse filter can be included in driver software which is stored by computer 4 (e.g., in memory 8). The driver software is asserted to (e.g., read from memory 8 by) computer 2 to program a sound card or other subsystem of computer 2 to apply the inverse filter to audio data to be reproduced by loudspeaker 11. In a typical signal path of loudspeaker 11 (or other speaker to which an inverse filter determined in accordance with the invention is to be applied), the audio data to be reproduced by the loudspeaker are inverse filtered (by the inverse filter) and undergo other digital signal processing, and then undergo digital-to-analog conversion in a digital to analog converter (DAC). The loudspeaker emits sound in response to the analog audio output of the DAC.

Typically, computer 2 of FIG. 1 is a notebook or laptop computer. Alternatively, the loudspeaker for which the inverse filter is determined (in accordance with the invention) is included in a television set or other consumer device, or some other device or system (e.g., it is an element of a home theater or stereo system in which an A/V receiver or other element applies the inverse filter in the loudspeaker's signal path). The same computer that generates averaged impulse response data for use in determining the inverse filter need not execute the software that determines the inverse filter in response to the averaged impulse response data. Different computers (or other devices or systems) may be employed to perform these functions.

Typical embodiments of the invention determine an inverse filter (e.g., a set of coefficients that determine an inverse filter) for a loudspeaker to be included in a manufacturer's or retailer's product (e.g., a flat panel TV, or laptop or notebook computer). It is contemplated that an entity other than the manufacturer or retailer may measure the loudspeaker's impulse response and determine the inverse filter, and then provide the inverse filter to the manufacturer or retailer who will then build the inverse filter into a driver for the speaker in the product (or otherwise configure the product such that the inverse filter is applied in the speaker's signal path). Alternatively, the inventive method is performed in an appropriately pre-programmed and/or pre-configured consumer product (e.g., an A/V receiver) under control of the product user (e.g., the consumer), including by making the impulse response measurements, determining the inverse filter, and applying it in the signal path of the relevant speaker.

In embodiments in which the averaged impulse response data is banded into critically banded data, the banding preferably mimics the frequency resolution of the human auditory system. In some implementations of the described embodiments in which computer 4 (of FIG. 1) performs a time-to-frequency domain transform on averaged impulse response data to generate frequency components, in each of the k transform bins (where k is typically 512 or 256), that are indicative of a measured averaged impulse response, combines these frequency components to generate critically banded data, and uses the critically banded data to determine an inverse filter (in the frequency domain), the banding is performed as follows. Computer 4 weights the frequency components in the transform frequency bins by applying appropriate filters thereto (typically, a different filter is applied for each critical frequency band) and generates a frequency component for each of the critical frequency bands by summing the weighted data for said band.

Figure 7:
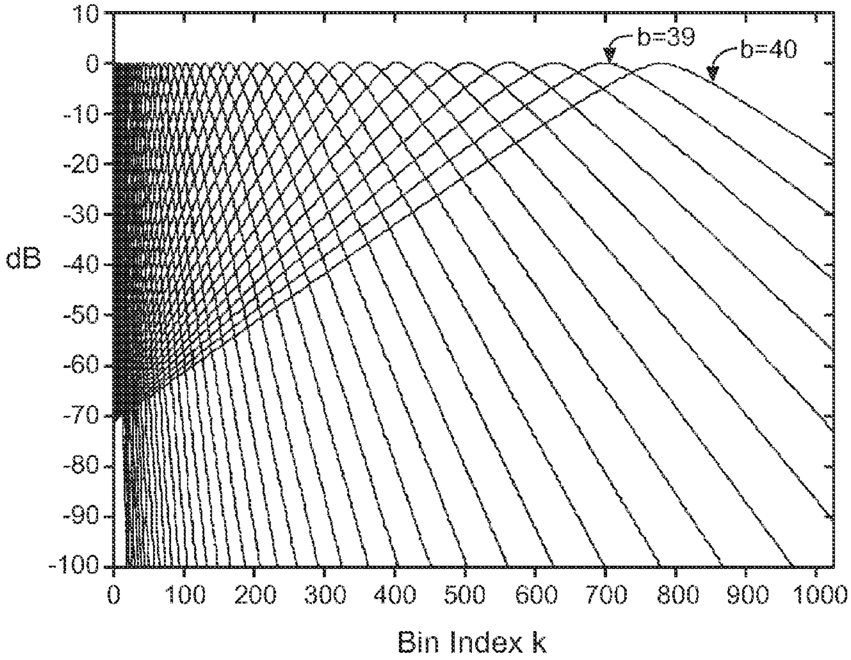
FIG. 7 is a graph of filters employed in an implementation of computer 4 of FIG. 1 to group frequency components in k=1024 Fourier transform bins into b=40 critical frequency bands of filtered frequency components.

Typically, a different filter is applied for each critical frequency band, and these filters exhibit an approximately rounded exponential shape and are spaced uniformly on the Equivalent Rectangular Bandwidth (ERB) scale. The ERB scale is a measure used in psychoacoustics that approximates the bandwidth and spacing of auditory filters. FIG. 7 depicts a suitable set of filters with a spacing of one ERB, resulting in a total of 40 critical frequency bands, b, for application to frequency components in each of 1024 frequency bins, k.

The spacing and overlap in frequency of the critical frequency bands provide a degree of regularization of the measured impulse response that is commensurate with the capabilities of the human auditory system. The critical band filters typically smooth out irregularities of the impulse response that are not perceptually relevant, so that the final correction filter does not need to spend resources correcting these details. Alternatively, the averaged impulse response (and optionally also the resulting inverse filter) are smoothed in another manner to remove frequency detail that is not perceptually relevant. For example, the frequency components of the averaged impulse response in critical frequency bands to which the ear is relatively less sensitive may be smoothed, and the frequency components of the averaged impulse response in critical frequency bands to which the ear is relatively more sensitive are not smoothed.

Figure 3:
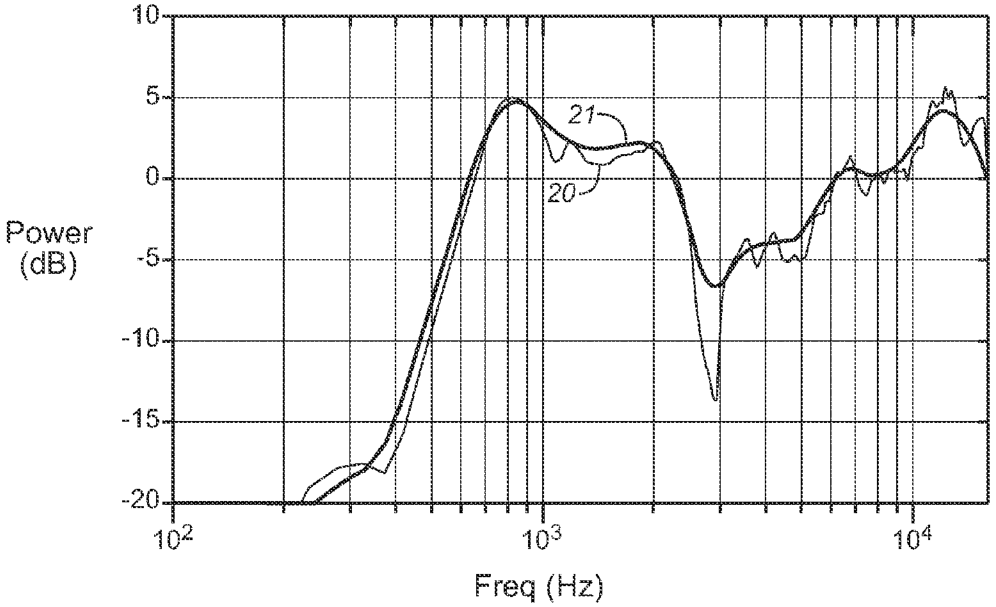
FIG. 3 is a graph of averaged frequency response 20 of FIG. 2, and a graph of smoothed frequency response 21 which is a smoothed version of averaged response 20 of FIG. 2 which results from critical band smoothing of the frequency components that determine response 20.

Curve 21 of FIG. 3 is a graph of the smoothed frequency response of speaker 11 (a smoothed version of curve 20 of FIG. 3 which is a frequency domain representation of the averaged impulse response of speaker 11) which results from critical band smoothing of the frequency components that determine curve 20 of FIG. 2 (curve 20 is also shown in FIG. 3). Curve 21 is a frequency domain representation of the smoothed averaged impulse response determined by curve 20, resulting from critical band smoothing of the frequency components that determine curve 20.

Computer 4 typically also determines the low frequency cut-off of speaker 11's frequency response (typically, the −3 dB point), typically from the critically banded data (following the critical band filtering). It is useful to determine this cut-off for use in determining the inverse filter, so that the inverse filter does not try to over-compensate for frequencies below the cut-off and drive the speaker into non-linearity.

Typically, the low frequency cut-off of the inverse filter and target response are adjusted to match the previously determined low frequency cut-off of the speaker's measured response. Also, other local regularization may be performed on various critical bands of the inverse filter to compensate for spectral components.

In order to maintain equal loudness when using the inverse filter, the inverse filter is preferably normalized against a reference signal (e.g., pink noise) whose spectrum is representative of common sounds. The overall gain of the inverse filter is adjusted so that a weighted rms measure (e.g., the well known weighted power parameter LeqC) of the inverse filter applied to the original impulse response applied to the reference signal is equal to the same weighted rms measure of the original impulse response applied to the reference signal. This normalization ensures that when the inverse filter is applied to most audio signals, the perceived loudness of the audio does not shift.

Figure 4:
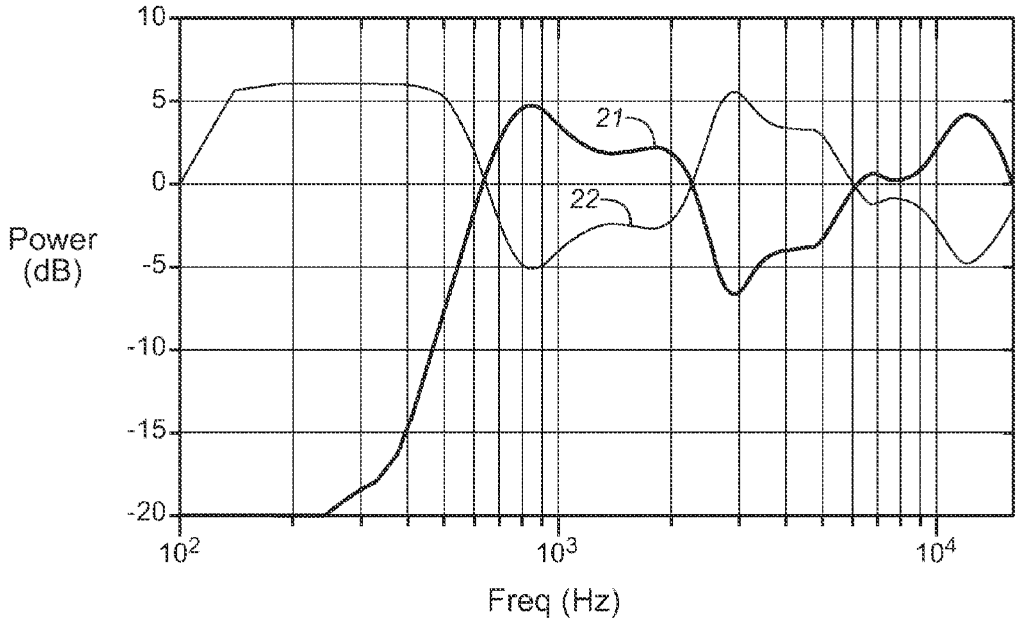
FIG. 4 is a graph of an inverse filter 22 determined (using global regularization) from smoothed frequency response 21 of FIG. 3 (curve 21 is also shown in FIG. 4). Inverse filter 22 is the inverse of response 21 with a limit of +6 dB maximum gain.
Figure 5:
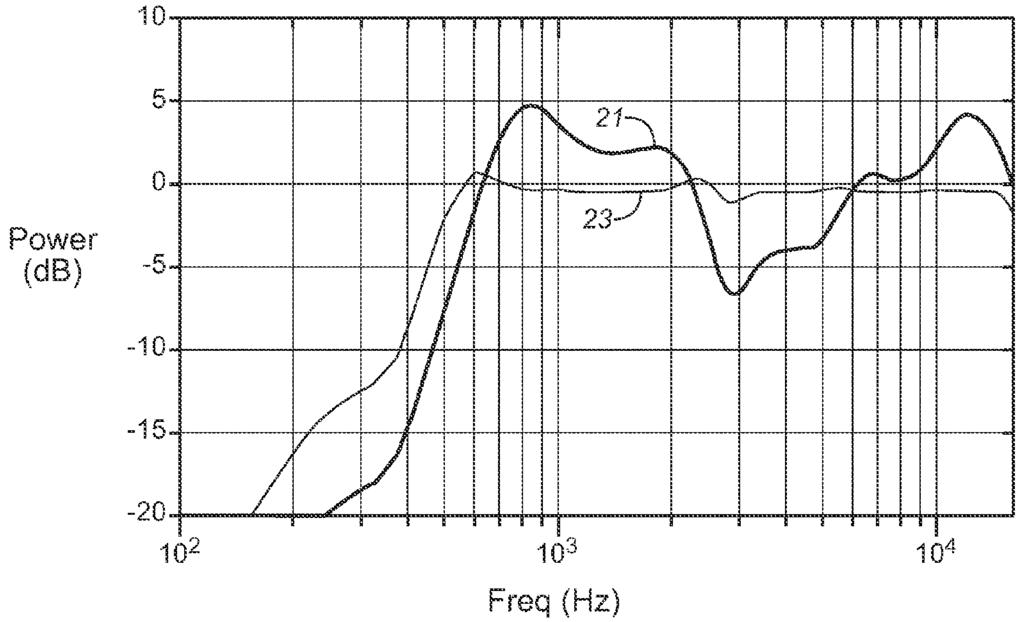
FIG. 5 is a graph of an inverse-filtered, smoothed frequency response 23, which would result from application of inverse filter 22 (of FIG. 4) in the signal path of a speaker having the smoothed frequency response 21 of FIG. 3. Curve 21 is also shown in FIG. 5.

Typically also, the overall maximum gain applied by the inverse filter is limited to or by a predetermined amount. This global regularization is used to ensure that the speaker is never driven too hard in any band. For example, FIG. 4 is a graph of an inverse filter 22 determined from smoothed frequency response 21 of FIG. 3 that exhibits such global regularization. Curve 21 is also shown in FIG. 4. Inverse filter 22 is the inverse of response 21, with a limit of +6 dB maximum gain. Inverse filter 22 is determined with the low frequency cut-off of the target response matching the low frequency cut-off indicated by response 21. FIG. 5 is a graph of an inverse-filtered, smoothed frequency response 23 which would result from application of inverse filter 22 (of FIG. 4) in the signal path of a speaker having the frequency response 21 shown in FIGS. 3 and 4. Curve 21 is also shown in FIG. 5.

Figure 6:
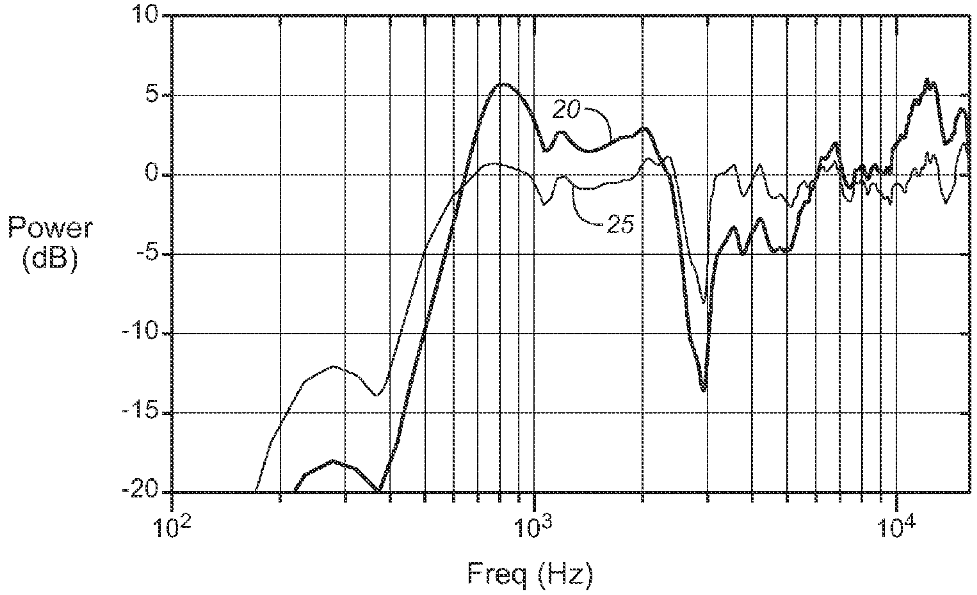
FIG. 6 is a graph of the inverse-filtered frequency response 25 of speaker 11, obtained by applying inverse filter 22 (of FIG. 4) in the signal path of speaker 11. Speaker 11's averaged frequency response 20 is also shown in FIG. 5.

FIG. 6 is a graph of the inverse-filtered frequency response 25 of speaker 11, obtained by applying inverse filter 22 (of FIG. 4) in the signal path of speaker 11. Speaker 11's averaged frequency response 20 (described above with reference to FIG. 2) is also shown in FIG. 6.

Optionally, the inventive method includes a step of applying a frequency-to-time domain transform (e.g., the inverse of the transform applied to the averaged impulse response to generate frequency domain average impulse response data in some embodiments of the invention) to an inverse filter (whose frequency coefficients have been determined in the frequency domain) to obtain a time-domain inverse filter. This is useful when no frequency-domain processing is to occur in the actual application of the inverse filter.

In a second class of embodiments, the inverse filter coefficients are directly calculated in the time domain. The design goals, however, are formulated in the frequency domain with an objective to minimize an error expression (e.g., a mean square error expression). Initially, steps of measuring the speaker's impulse responses at multiple locations, and time aligning and averaging the measured impulse responses are performed (e.g., in the same manner as in embodiments in which the inverse filter coefficients are determined by frequency domain calculations). The averaged impulse response is optionally windowed and smoothed to remove unnecessary frequency detail (e.g., bandpass filtered versions of the averaged impulse response are determined in different frequency windows and selectively smoothed, so that the smoothed, bandpass filtered versions determine a smoothed version of the averaged impulse response). For example, the averaged impulse response may be smoothed in critical frequency bands to which the ear is relatively less sensitive, but not smoothed (or subjected to less smoothing) in critical frequency bands to which the ear is relatively more sensitive. Optionally also, the target response is windowed and smoothed to remove unnecessary frequency detail, and/or values for determining the inverse filter are determined in windows and smoothed to remove unnecessary frequency detail. To minimize an error (e.g., mean square error) between the target response and the averaged (and optionally smoothed) impulse response, typical embodiments of the inventive method employ either one of two algorithms. The first algorithm implements eigenfilter design theory and the other minimizes a mean square error expression by solving a linear equation system.

Figure 8:
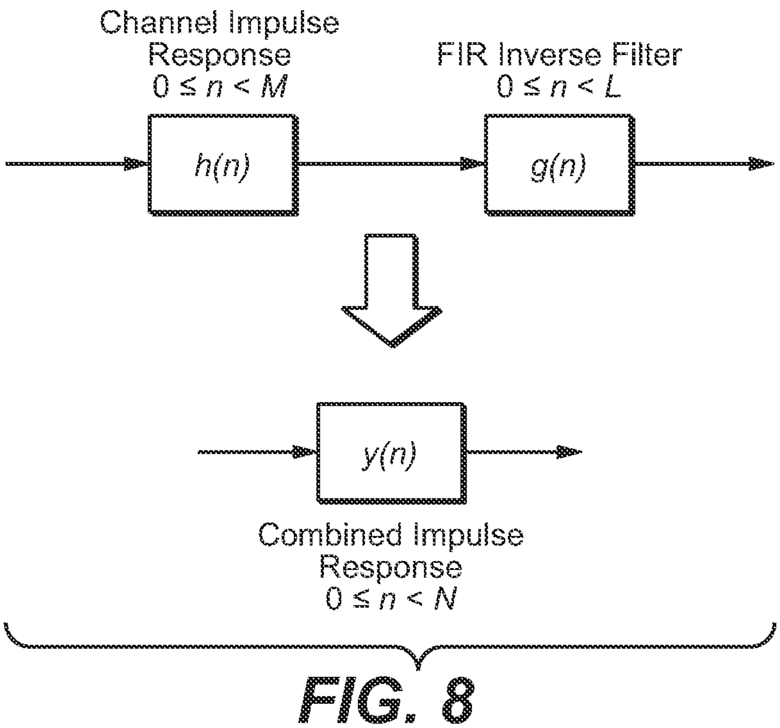
FIG. 8 is a diagram of an inverse filter and impulse responses employed to generate the inverse filter in the time domain in a class of embodiments of the inventive method. These embodiments determine time-domain coefficients g(n) of a finite impulse response (FIR) inverse filter, sometimes referred to herein as g, where $0 \le n < L$, that, when applied to a loudspeaker's averaged impulse response (denoted in FIG. 8 as a "channel impulse response") having coefficients h(n), where $0 \le n < M$, produces a combined impulse response having coefficients y(n), where $0 \le n < N$, where the combined impulse response matches a target impulse response.

With reference to FIG. 8, typical embodiments in the second class determine (in the time domain) coefficients g(n) of a finite impulse response (FIR) inverse filter, sometimes referred to herein as g, where $0 \le n < L$. More specifically, these embodiments determine inverse filter coefficients g(n) that, when applied to the loudspeaker's averaged (measured) impulse response (referred to in FIG. 8 as the "channel impulse response") having coefficients h(n), where $0 \le n < M$, produces a combined impulse response having coefficients y(n), where $0 \le n < N$, where the combined impulse response matches a target impulse response. To minimize a mean square error (between the target response and averaged measured impulse response) either of two algorithms is preferably employed. The first implements eigenfilter design theory and the other minimizes the mean square error expression by solving a linear equation system.

The first algorithm adapts eigenfilter theory to the problem of finding an inverse filter that is optimal, in terms of a Minimum Mean Square Error (MMSE). Eigenfilter theory uses the Rayleigh principle which states that for an equation formulated as a Rayleigh quotient, the minimum eigenvalue of the system matrix will also be the global minimum for the equation. The eigenvector corresponding to the minimum eigenvalue will then be the optimal solution for the equation. This approach is very theoretically appealing for determining an inverse filter but the difficulty lies in finding the "minimum" eigenvector, which is not a trivial task for large equation systems.

A total error between the target response and averaged (measured) impulse response is expressed in terms of a stop band error $\epsilon_s$ and a pass band error $\epsilon_p$:

$$\epsilon_t=(1-\alpha)\epsilon_p+\alpha\epsilon_s$$

where $\alpha$ is a factor that weights the stop band error $\epsilon_s$ against the pass band error $\epsilon_p$. The full frequency range of the loudspeaker is partitioned into stop and pass bands (typically, two stop bands, and one pass band between frequencies $\omega_{sl}$ and $\omega_{ul}$), and the weighting factor, $\alpha$, may be chosen in any of many different suitable ways. For example, the stop band may be the frequency range below a low frequency cut-off and above a high frequency cut-off of the speaker's frequency response.

The stop band error $\epsilon_s$ and the pass band error $\epsilon_p$, are defined as follows:

$$\varepsilon_s = \frac{1}{\pi}\int_0^{\omega_{sl}} |Y(e^{j\omega})|^2\,d\omega + \frac{1}{\pi}\int_{\omega_{su}}^{\pi} |Y(e^{j\omega})|^2\,d\omega \qquad \text{(Eq. 1)}$$

and $$\varepsilon_p = \frac{1}{\pi}\int_{\omega_{pl}}^{\omega_{pu}} |P(e^{j\omega}) - Y(e^{j\omega})|^2\,d\omega, \qquad \text{(Eq. 2)}$$

where $P(e^{j\omega})=e^{-j\omega g_d}$ is the target frequency response, $g_d$ is the group delay, and $Y(e^{j\omega})$ is the Fourier transform of the inverse filter convolved with the averaged (measured) impulse response. In this case, gain in the pass band is always 1, and the target response is just the Fourier Transform of a delayed dirac delta function $\delta(n-g_d)$. The combined impulse response coefficients y(n) satisfy:

$$y(n) = g(n) \otimes h(n) = \sum_{m=0}^{\infty} g(m)h(n-m).$$

The inverse filter g(n) is of length L and the averaged (measured) impulse response h(n) is of length M. The resulting impulse response y(n) is hence of length N=M+L−1. The convolution above may also be written as a matrix-vector product as $$y(n)=g(n)\otimes h(n)=Hg \qquad \text{(Eq. 3)}$$

where H is a matrix of size N×L with elements as $$H = \begin{bmatrix} h(0) & 0 & 0 & \dots & 0 \\ h(1) & h(0) & 0 & & 0 \\ h(2) & h(1) & h(0) & & \vdots \\ \vdots & h(2) & h(1) & \ddots & 0 \\ h(M-1) & \vdots & h(2) & \ddots & 0 \\ 0 & h(M-1) & \vdots & \ddots & h(0) \\ 0 & 0 & h(M-1) & & h(1) \\ \vdots & 0 & 0 & & h(2) \\ 0 & \vdots & \vdots & \ddots & \vdots \\ 0 & 0 & 0 & \dots & h(M-1) \end{bmatrix}$$

and g is a vector of length L defined as $$g=[g(0)g(1)g(2)\ldots g(L-1)]^T,$$

whose elements are the inverse filter coefficients.

The Fourier transform of y(n) is $$Y(e^{j\omega}) = \sum_{n=0}^{\infty} y(n)e^{-j\omega n} = y^T e(e^{j\omega}) \qquad \text{(Eq. 4)}$$

with $y=[y(0)y(1)y(2) \ldots y(N-1)]^T$ and $e(e^{j\omega})=[1e^{-j\omega}e^{-j2\omega} \ldots e^{-j(N-1)\omega}]^T$.

Equation (3) inserted into equation (4) gives $$Y(e^{j\omega})=y^T e(e^{j\omega})=[Hg]^T e(e^{j\omega})=g^T H^T e(e^{j\omega}) \qquad \text{(Eq. 5).}$$

The integrand of above Equation 1 (for the stop band error $\epsilon_s$) becomes $$|Y(e^{j\omega})|^2=|g^T H^T e(e^{j\omega})|^2=[g^T H^T e(e^{j\omega})][g^T H^T e(e^{j\omega})]^\dagger=g^T H^T e(e^{j\omega})e^\dagger(e^{j\omega})H^* g^*.$$

So the stop band error may be formulated as $$\epsilon_s=g^T P_s g^* \qquad \text{(Eq. 6)}$$

with $$P_s = H^T \left\{ \begin{array}{l} \frac{1}{2\pi}\int_{-\omega_{sl}}^{\omega_{sl}} e(e^{j\omega})e^\dagger(e^{j\omega})d\omega + \\ \frac{1}{2\pi}\int_{\omega_{su}}^{2\pi-\omega_{su}} e(e^{j\omega})e^\dagger(e^{j\omega})d\omega \end{array} \right\} H^* = H^T L_s H. \qquad \text{(Eq. 7)}$$

H is real valued, and the (n,m):th element of $L_s$ is given by $$[L_s]_{n,m} = \frac{1}{\pi}\int_0^{\omega_{sl}} \cos[\omega(n-m)]\,d\omega + \frac{1}{\pi}\int_{\omega_{su}}^{\pi} \cos[\omega(n-m)]\,d\omega,\quad 0 \le n, m < N.$$

All elements of $L_s$ are real. Moreover, the elements are determined completely by the difference |n−m|, hence the matrix is both Toeplitz and symmetric, i.e., $L_S^T=L_s$. In order to avoid trivial solutions, we add the unit norm constraint on g as $g^T g^*=1$. Thus, we may write the stop band error as $$\varepsilon_s = \frac{g^T P_s g^*}{g^T g^*}. \qquad \text{(Eq. 8)}$$

The stop band error expressed as in Equation 8 is actually the expression for a normalized eigenvalue of $P_s$, given that g is an eigenvector of $P_s$. Since $P_s$ is symmetric and real (H is by definition real), all eigenvalues are real, and hence also the vector g. The stop band error expressed as in Equation 8 is bounded by $$\lambda_{min} \le \frac{g^T P_s g}{g^T g} \le \lambda_{max}$$

where $\lambda_{min}$ and $\lambda_{max}$ are the minimum and maximum eigenvalues of $P_s$ respectively. Hence, minimizing the stop band error expressed as in Eq. (8) (e.g., as a Rayleigh quotient) is equivalent to finding the minimum eigenvalue of $P_s$ and the corresponding eigenvector.

In order to formulate the pass band error in the same manner we need to introduce a reference frequency, $\omega_0$, at which the desired frequency response exactly matches the frequency response of $Y(e^{j\omega})$, as $$\varepsilon_p = \frac{1}{\pi}\int_{\omega_{pl}}^{\omega_{pu}} \left|P(e^{j\omega}) - Y(e^{j\omega})^2\right| d\omega \Rightarrow \varepsilon_p' = \frac{1}{\pi}\int_{\omega_{pl}}^{\omega_{pu}} \left|\frac{P(e^{j\omega})}{P(e^{j\omega_0})}Y(e^{j\omega_0}) - Y(e^{j\omega})\right|^2 d\omega.$$

The pass band error will be exactly zero at $\omega_0$. Substituting Equation 3 into this modified pass band error expression gives $$\begin{aligned} \left|\frac{P(e^{j\omega})}{P(e^{j\omega_0})}Y(e^{j\omega_0}) - Y(e^{j\omega})\right|^2 &= \left|\frac{P(e^{j\omega})}{P(e^{j\omega_0})}g^T H^T e(e^{j\omega_0}) - g^T H^T e(e^{j\omega})\right|^2 = \\ &= \left[\frac{P(e^{j\omega})}{P(e^{j\omega_0})}g^T H^T e(e^{j\omega_0}) - g^T H^T e(e^{j\omega})\right] \\ &\quad \left[\frac{P(e^{j\omega})}{P(e^{j\omega_0})}g^T H^T e(e^{j\omega_0}) - g^T H^T e(e^{j\omega})\right]^\dagger = \\ &= g^T H^T\left[\frac{P(e^{j\omega})}{P(e^{j\omega_0})}e(e^{j\omega_0}) - e(e^{j\omega})\right] \\ &\quad \left[\frac{P(e^{j\omega})}{P(e^{j\omega_0})}e(e^{j\omega_0}) - e(e^{j\omega})\right]^\dagger H^* g^* \end{aligned}$$

The pass band error can thus be written as $$\epsilon_p'=g^T P_p g^* \qquad \text{(Eq. 9),}$$

with $$P_p = H^T\left\{\frac{1}{\pi}\int_{\omega_{pl}}^{\omega_{pu}} \mathrm{Re}\left\{\left[\frac{P(e^{j\omega})}{P(e^{j\omega_0})}e(e^{j\omega_0}) - e(e^{j\omega})\right]\left[\frac{P(e^{j\omega})}{P(e^{j\omega_0})}e(e^{j\omega_0}) - e(e^{j\omega})\right]^\dagger\right\}d\omega\right\}H^* = H^T L_p H. \qquad \text{(Eq. 10)}$$

Again, H is real valued. The (n,m):th element of $L_p$ is given by $$[L_p]_{n,m} = \frac{1}{\pi}\int_{\omega_{pl}}^{\omega_{pu}} \{\cos[\omega(n-m)] + \cos[\omega_0(n-m)] + -\cos[\omega(m-g_d) - \omega_0(n-g_d)] + -\cos[\omega(n-g_d) - \omega_0(m-g_d)]\}d\omega,\ 0 \le n, m < N$$

It is easily verified that this matrix is real valued, symmetric, but not Toeplitz (i.e., the elements on the diagonals are not identical). By again adding the unit norm constraint, we may write the pass band error as a Rayleigh quotient as $$\varepsilon'_p = \frac{g^T P_p g}{g^T g}, \quad \text{(Eq. 11)}$$

which again may be minimized by finding the minimum eigenvalue of $P_p$ and the corresponding eigenvector.

The expression for the total error may thus be formulated as $$\begin{aligned}\varepsilon_t &= (1-\alpha)\varepsilon_p + \alpha\varepsilon_s \quad \text{(Eq. 12)}\\ &= (1-\alpha)\frac{g^T P_p g}{g^T g} + \alpha\frac{g^T P_s g}{g^T g}\\ &= \frac{g^T[(1-\alpha)P_p + \alpha P_s]g}{g^T g}\\ &= \frac{g^T P g}{g^T g}.\end{aligned}$$

It can be verified that the eigenvalues of P are clustered around 1-α, α, and 0. In order to obtain the optimal inverse filter g, we need to find the eigenvector corresponding to the minimum eigenvalue of P. Examples of approaches that may be employed to do so include the following two approaches:

(1) a modified Power Method, in which the largest eigenvalue and the corresponding eigenvector are iteratively obtained. By solving for x in an equation system Px=b (e.g., using Gauss elimination), the minimum eigenvector may be found instead of the largest. Alternatively, the minimum eigenvalue is found by determining the largest eigenvalue for the expression $\lambda_{max}I-P$, where $\lambda_{max}$ is the largest eigenvalue for matrix P and I is the identity matrix. However, the modified Power Method requires finding an inverse of a matrix, and the alternative method has the drawback of converging slowly. For a typical system matrix P the smallest eigenvalues will be clustered around zero, hence the eigenvalues of $\lambda_{max}I-P$ will be clustered around $\lambda_{max}$, and the modified Power Method converges fast only if the maximum eigenvalue is an "outlier", i.e. $\lambda_{max} >> \lambda_{max-1}$; and (2) the Conjugate Gradient (CG) method for finding the minimum eigenvalue of a matrix. The CG method is an iterative method conventionally performed to solve equation systems. It can be reformulated to find the largest or the smallest eigenvalue and the corresponding eigenvectors of a matrix. The CG method attains useful results but also converges quite slowly, albeit much faster than the Power Method described above. Preconditioning (e.g., diagonalization) of the system matrix results in faster convergence of the CG method.

We next describe a second algorithm for minimizing the mean square error between the target response of a loudspeaker and the averaged measured impulse response. In the second algorithm, in which a reformulation of the error function makes the CG method for solving equation systems applicable, an approximate solution is found rapidly, typically with only a few iterations, in contrast with the eigenmethod (employed in the first algorithm) which needs to converge fully in order to obtain a useful result (since an "approximate" "minimum" eigenvector is typically useless as an inverse filter). Another disadvantage of the eigenmethod (employed in the first algorithm) is that the system matrix is Hermitian (symmetric) but in general not Toeplitz. This means that approximately half of the matrix elements need to be stored in memory. If the matrix were also Toeplitz, only the first row (or column) would describe the entire matrix. This is the case for the second algorithm, in which the system matrix is both Hermitian and Toeplitz. Further, a product between a Hermitian Toeplitz matrix and a vector can be calculated via the FFT by extending the matrix to become a circulant matrix. This means that such a matrix-vector product can be performed by element wise multiplication of two vectors in the Fourier transform domain. However, the convergence rate for the CG method may be undesirably low unless the equation system is preconditioned (as in the PCG method to be described).

Figure 9:
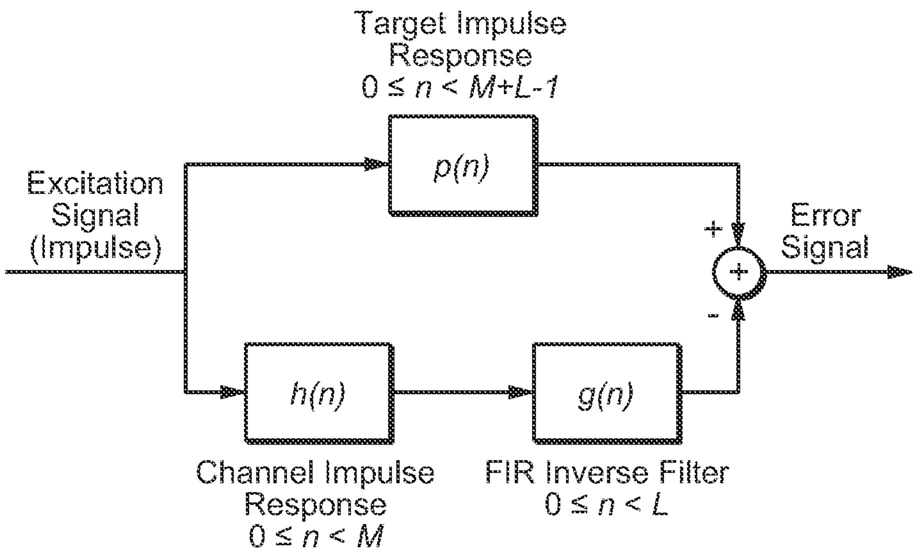
FIG. 9 is a diagram of an inverse filter and impulse responses employed to generate the inverse filter in the time domain in a class of embodiments of the inventive method which minimize a mean square error expression by solving a linear equation system. These embodiments determine coefficients g(n) of a finite impulse response (FIR) inverse filter, sometimes referred to herein as g, where $0 \le n < L$, that, when applied to a loudspeaker's averaged impulse response (denoted in FIG. 9 as a "channel impulse response") having coefficients h(n), where $0 \le n < M$, produces a combined impulse response having coefficients y(n), where $0 \le n < M+L-1$. In these embodiments, an error expression is indicative of the difference between the combined impulse response coefficients and the coefficients p(n) of a predetermined target impulse response. A mean square error determined by the error expression is minimized to determine the inverse filter coefficients g(n).

With reference to FIG. 9, the second algorithm determines (in the time domain) coefficients g(n) of a finite impulse response (FIR) inverse filter g, where 0≤n<L, by minimizing a mean square error. More specifically, this algorithm determines inverse filter coefficients g(n) that, when applied to the loudspeaker's averaged (measured) impulse response (referred to in FIG. 9 as the "channel impulse response") having coefficients h(n), where 0≤n<M, produces a combined impulse response having coefficients y(n), where 0≤n<M+L−1. An error signal is indicative of the difference between the combined impulse response coefficients and the coefficients p(n) of a predetermined target impulse response. A mean square error determined by the error signal is minimized to determine the inverse filter coefficients g(n).

In the second algorithm, a mean square error is minimized by means of preconditioning of an equation system, and thus the algorithm is sometimes referred to herein as the "PCG" method. In the PCG method, a total error function is defined as $$E_{MSE} = \frac{1}{2\pi}\int_0^{2\pi} W(\omega)|P(e^{j\omega}) - H(e^{j\omega})G(e^{j\omega})|^2\, d\omega$$

where W(ω) is a weighting function and the target frequency response is $$P(e^{j\omega}) = P_R(\omega)e^{-j\omega g_d}$$

where $g_d$ is the desired group delay and $P_R(\omega)$ is a zero phase function. With this error expression, the target frequency function will cover both the stop band case where $P_R(\omega)\approx 0$ and also the pass band case with arbitrary frequency response.

The entire positive frequency range is divided (e.g., partitioned) into a plurality of frequency ranges. These ranges can be of equal width or can be chosen in any of a variety of suitable ways depending on the shape of the target response and the measured impulse response of the speaker. The frequency ranges could be critical frequency bands of the type discussed above. Typically, a small number of frequency ranges (e.g., six frequency ranges) is chosen. For example, a lowest one of the frequency ranges may consist of stop band frequencies below a low frequency cut-off of the speaker's frequency response (e.g., frequencies less than 400 Hz, if the −3 dB point of the speaker's frequency response is 500 Hz), a next lowest one of the frequency ranges may consist of "transition band" frequencies between the highest preceding stop band frequency and a somewhat higher frequency (e.g., frequencies between 400 Hz and 500 Hz, if the −3 dB point of the speaker's frequency response is 500 Hz), and so on. The choice of frequency ranges that partition the full frequency range is not critical for embodiments where the zero phase characteristics of the target response are explicitly given by the values of $P_R(\omega)$ for the full frequency range. Typically, the $P_R(\omega)$ is given as an initial value and a final value within each frequency range, but embodiments are also contemplated in which there is only one frequency range and a more complex function (or set of discrete values) describe $P_R(\omega)$ and $W(\omega)$. The error function is thus $$E_{MSE}=\sum_k \varepsilon^{(k)}(\omega_l,\omega_u)$$

where the division is made into k ranges (each from a lower frequency $\omega_l$ to an upper frequency $\omega_u$), and the error function for each range is $$\varepsilon(\omega_l,\omega_u)=\frac{1}{\pi}\int_{\omega_l}^{\omega_u} W(\omega)|P(e^{j\omega})-H(e^{j\omega})G(e^{j\omega})|^2\,d\omega.$$

In order to solve these integrals analytically we may use simple closed form expressions for both $W(\omega)$ and $P_R(\omega)$ in each frequency range. A suitable choice (for each of $W(\omega)$ and $P_R(\omega)$) is preferably a sinusoidal function of the form $$F(\omega)=\overline{F}+\frac{1}{2}\Delta F\sin\left(\frac{\pi}{\Delta\omega}(\omega-\overline{\omega})\right),\ \omega_l\le\omega\le\omega_u$$

or a linear function of the form $$F(\omega)=\overline{F}+\frac{\Delta F}{\Delta\omega}(\omega-\overline{\omega}),\ \omega_l\le\omega\le\omega_u$$

with $$\begin{cases}\overline{F}=\dfrac{F_u+F_l}{2}\\ \Delta F=F_u-F_l\\ \overline{\omega}=\dfrac{\omega_u+\omega_l}{2}\\ \Delta\omega=\omega_u-\omega_l\end{cases}$$

and $F_u$ and $F_l$ being predetermined boundary values at the frequencies $\omega_u$ and $\omega_l$ respectively. With the same notation as before each error function is written $$\varepsilon(\omega_l,\omega_u)=\frac{1}{\pi}\int_{\omega_l}^{\omega_u} W(\omega)|P_R(\omega)e^{-j\omega g_d}-g^TH^Te(e^{j\omega})|^2\,d\omega=$$
$$=\frac{1}{\pi}\int_{\omega_l}^{\omega_u}\{W(\omega)|P_R(\omega)|^2+g^TH^TW(\omega)e(e^{j\omega})e^{\dagger}(e^{j\omega})Hg-W(\omega)P_R(\omega)c^T(\omega)Hg\}\,d\omega$$

where $$c(\omega)=[\cos(\omega g_d)\cos(\omega(1-g_d))\cos(\omega(2-g_d))\ldots\cos(\omega(N-1-g_d))]^T.$$

Since H and g are real, i.e. $H^*=H$, $g^*=g$, the error function becomes $$\epsilon(\omega_l,\omega_u)=c+g^TH^TPHg-r^THg$$

where $$c=\frac{1}{\pi}\int_{\omega_l}^{\omega_u} W(\omega)|P_R(\omega)|^2\,d\omega$$

is a constant expression independent of g, $$P=\frac{1}{\pi}\int_{\omega_l}^{\omega_u} W(\omega)e(e^{j\omega})e^{\dagger}(e^{j\omega})\,d\omega \qquad \text{(Eq. 13)}$$

and $$r=\frac{1}{\pi}\int_{\omega_l}^{\omega_u} W(\omega)P_R(\omega)c(\omega)\,d\omega. \qquad \text{(Eq. 14)}$$

Adding also the contributions from negative frequency components, the elements of matrix P become $$[P]_{n,m}=\frac{1}{\pi}\int_{\omega_l}^{\omega_u} W(\omega)\cos[\omega(n-m)]\,d\omega,\ 0\le n,m<N \qquad \text{(Eq. 15)}$$

and the elements of vector r are $$[r]_n=\frac{2}{\pi}\int_{\omega_l}^{\omega_u} W(\omega)P_R(\omega)\cos[\omega(n-g_d)]\,d\omega,\ 0\le n<N. \qquad \text{(Eq. 16)}$$

In Equations 15 and 16, the parameters n, and N=M+L−1 are the same as in FIG. 9.

The integral equations 15 and 16 are easily solved analytically when substituting in the closed form expressions for the functions $W(\omega)$ and $P_R(\omega)$. For more complex functions $W(\omega)$ and $P_R(\omega)$, or when $W(\omega)$ and/or $P_R(\omega)$ are (or is) represented as numerical data (e.g., from a graph), the equations 15 and 16 are preferably solved using numerical methods.

In order to minimize the total error we compute the gradient of the error function $E_{MSE}$, namely:

$$\nabla E_{MSE}=(H^TPH+H^TP^TH)g-r^TH=2H^TPHg-r^TH \qquad \text{(Equation System 17)}$$

since P is symmetric. Note that in Equation System 17, P and r are the sums of all P and r contributions from all frequency ranges. Thus, integral equations 15 and 16 are solved (preferably analytically) for each of the frequency ranges, and the solutions are summed to determine matrix P and vector r in Equation System 17.

Setting the gradient (expressed as in Equation System 17) equal to zero we obtain the vector g that minimizes the error expression by solving the linear equation system:

$$H^TPHg=\frac{1}{2}r^TH. \qquad \text{(Equation System 18)}$$

Recall that the vector g is defined as $g=[g(0)\ g(1)\ g(2)\ldots g(L-1)]^T$, and its elements are the inverse filter coefficients.

Equation System (18) is preferably solved by using the conjugate gradient (CG) method. The CG algorithm is originally an iterative method that solves Hermitian (symmetric) positive definite (all eigenvalues strictly positive, i.e. $\lambda_n>0$)

systems of equations. Preconditioning of the system matrix $Q=H^TPH$ significantly improves the convergence of the CG algorithm. The convergence depends on the eigenvalues of the matrix Q. Where $P_R(\omega)$ is strictly defined for each of the frequency ranges (including each frequency range that is a transition band of the full frequency range), the eigenvalues of the system matrix Q will be clustered around the different values of $W(\omega)$, i.e. there are no clustered eigenvalues around zero (as long as $W(\omega)\neq 0$) which otherwise would make the convergence slow. If the spectrum of eigenvalues is clustered around one (i.e. the system matrix approximates the unity matrix), the convergence will be fast. Hence, we construct a preconditioning matrix A such that $$A^{-1}Q\approx I,$$

where I is the identity matrix and Q is the system matrix $Q=H^TPH$.

Instead of solving Equation system (18), we solve the preconditioned system $$A^{-1}Qg = \frac{1}{2}A^{-1}r^TH. \qquad \text{(Equation System 19)}$$

Given the foregoing description, it will be apparent to those of ordinary skill in the art how to implement an appropriate inverse preconditioning matrix $A^{-1}$ suitable for determining and efficiently solving Equation System 19 in accordance with the invention.

When performing inverse filtering in accordance with the invention:

the inverse filter can be designed so that the inverse-filtered response of the loudspeaker has either linear or minimum phase. The complex cepstrum technique for spectral factorization can be used to factor the above-defined vector r into its minimum-phase and maximum-phase components, whereafter the minimum-phase component replaces r in the subsequent calculations. Alternatively, the group delay constant $g_d$ can be set to a low value to obtain an approximate resulting minimum phase response;

the target response $P_R(\omega)$ for each of the frequency ranges (from one of the lower frequencies $\omega_l$ to a corresponding one of the upper frequencies $\omega_u$) is preferably chosen to be sinusoidal or linear in such range (or to be another suitable function having closed form expression);

regularization is easily applied. Global regularization (e.g., a global limit on the gain applied by the inverse filter) can be applied to stabilize computations and/or penalize large gains in the inverse filter. Frequency dependent regularization can also be applied to penalize large gains for arbitrary frequency ranges. This can be accomplished by assigning a greater weight to the matrix P for certain frequency ranges (e.g., increasing $W(\omega)$ in Equation 15 while keeping $W(\omega)$ unchanged for vector r in Equation 16)); and the method for determining the inverse filter can be implemented either to perform all pass processing of arbitrary frequency ranges (to perform phase equalization only for chosen frequency ranges) or pass-through processing of arbitrary frequency ranges (to equalize neither the magnitude nor the phase for chosen frequency ranges). In a typical implementation of a pass-through mode, $P(e^{j\omega})$ is set to the loudspeaker's averaged frequency response, $P(e^{j\omega})=H(e^{j\omega})$, instead of being set to $P(e^{j\omega})=P_R(\omega)e^{-j\omega g_d}$, in the calculations for some frequency regions. In a typical implementation of an all-pass mode, absolute values of samples of the DFT of the loudspeaker's averaged impulse response are used as replacements for $P_R(\omega)$ in the calculations.

In typical embodiments, the inventive system for determining an inverse filter is or includes a general or special purpose processor programmed with software (or firmware) and/or otherwise configured to perform an embodiment of the inventive method. In some embodiments, the inventive system is a general purpose processor, coupled to receive input data indicative of the target response and the measured impulse response of a loudspeaker, and programmed (with appropriate software) to generate output data indicative of the inverse filter in response to the input data by performing an embodiment of the inventive method.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for determining an inverse filter for a loudspeaker having an impulse response, including the steps of: measuring the impulse response of the loudspeaker at each of a number of different locations relative to the loudspeaker; time-aligning and averaging the measured impulse responses to determine an averaged impulse response; and determining the inverse filter from the averaged impulse response and a target frequency response, including by applying critical frequency band smoothing, wherein the step of determining the inverse filter includes a step of normalizing the inverse filter against a reference signal, and said normalizing the inverse filter adjusts overall gain of the inverse filter so that perceived loudness of audio determined by the inverse filter applied to the averaged impulse response applied to the reference signal does not shift relative to perceived loudness of audio determined by the averaged impulse response applied to the reference signal.

2. The method of claim 1, wherein the critical frequency band smoothing is applied to the averaged impulse response during determination of the inverse filter.

3. The method of claim 1, wherein the critical frequency band smoothing is applied to the averaged impulse response and the target frequency response.

4. The method of claim 1, wherein the critical frequency band smoothing is applied to determine the target frequency response.

5. The method of claim 1, wherein b values for determining the inverse filter are determined from the target frequency response and the averaged impulse response, one of said values for each of b critical frequency bands, where b is a number, and the b values are filtered to determine k filtered values which determine the inverse filter, where k is a number greater than b.

6. The method of claim 5, wherein data indicative of the averaged impulse response are filtered in critical banding filters to determine the b values, and said b values are filtered in inverses of the critical banding filters to determine the k filtered values.

7. The method of claim 1, also including the step of:

altering the loudspeaker's output by applying the inverse filter in the loudspeaker's signal path.

8. The method of claim 1, also including the step of: altering the loudspeaker's output by applying the inverse filter in the loudspeaker's signal path thereby matching the inverse-filtered output of the loudspeaker to the target frequency response.

9. The method of claim 1, wherein the step of determining the inverse filter includes the steps of:

applying a time domain-to-frequency domain transform to the averaged impulse response to determine frequency coefficients;

critically banding the frequency coefficients to determine banded frequency coefficients; and determining the inverse filter in the frequency domain from the banded frequency coefficients and the target frequency response.

10. The method of claim 1, wherein the step of determining the inverse filter includes a step of determining a low frequency cut-off of the loudspeaker's frequency response, and the inverse filter is determined to have a low frequency cut-off that at least substantially matches the low frequency cut-off of the loudspeaker's frequency response.

11. The method of claim 1, wherein the step of determining the inverse filter includes a step of performing local regularization on at least one critical frequency band of the inverse filter.

12. The method of claim 1, wherein the step of determining the inverse filter includes a step of performing local regularization on a critical frequency band-by-critical frequency band basis.

13. The method of claim 1, wherein the step of determining the inverse filter includes a step of performing global regularization.

14. The method of claim 13, wherein said global regularization limits overall maximum gain applied by the inverse filter, when said inverse filter is applied in the loudspeaker's signal path.

15. A time-domain method for determining an inverse filter for a loudspeaker having an impulse response, including the steps of:

measuring the impulse response of the loudspeaker at each of a number of different locations relative to the loudspeaker;

time-aligning and averaging the measured impulse responses to determine an averaged impulse response; and determining the inverse filter in the time-domain from the averaged impulse response and a target frequency response, including by applying eigenfilter design theory to formulate and minimize an error between a target response for the loudspeaker and the averaged impulse response, wherein the error between the target response and the averaged impulse response is a mean square error, a matrix P determines the target impulse response, and the step of determining the inverse filter includes a step of determining coefficients, g(n), of the inverse filter by determining a minimum eigenvalue of the matrix P to minimize an expression for total error, $\epsilon_t$, of form $$\begin{aligned}\varepsilon_t &= (1-\alpha)\varepsilon_p + \alpha\varepsilon_s \\ &= (1-\alpha)\frac{g^T P_p g}{g^T g} + \alpha\frac{g^T P_s g}{g^T g}\end{aligned}$$

-continued $$\begin{aligned}&= \frac{g^T[(1-\alpha)P_p + \alpha P_s]g}{g^T g} \\ &= \frac{g^T P g}{g^T g},\end{aligned}$$

where the matrix $P=(1-\alpha)P_p+\alpha P_s$, $P_p$ is a pass band target impulse response, $P_s$ is a stop band target impulse response, g is a matrix that determines the inverse filter and has the coefficients g(n), $\epsilon_s$ is a stop band error, $\epsilon_p$ is a pass band error, and $\alpha$ is a weighting factor.

16. The method of claim 15, wherein the step of determining the inverse filter includes a step of performing local regularization on at least one critical frequency band of the inverse filter.

17. The method of claim 15, wherein the step of determining the inverse filter includes a step of performing local regularization on a critical frequency band-by-critical frequency band basis.

18. The method of claim 15, wherein the step of determining the inverse filter includes a step of normalizing the inverse filter against a reference signal.

19. The method of claim 18, wherein said normalizing the inverse filter adjusts overall gain of the inverse filter so that a weighted rms measure of the inverse filter applied to the averaged impulse response applied to the reference signal is at least substantially equal to said weighted rms measure of the averaged impulse response applied to the reference signal.

20. The method of claim 15, wherein the step of determining the inverse filter includes a step of performing global regularization.

21. The method of claim 20, wherein said global regularization limits overall maximum gain applied by the inverse filter, when said inverse filter is applied in the loudspeaker's signal path.

22. A time-domain method for determining an inverse filter for a loudspeaker having an impulse response, including the steps of:

measuring the impulse response of the loudspeaker at each of a number of different locations relative to the loudspeaker;

time-aligning and averaging the measured impulse responses to determine an averaged impulse response; and determining the inverse filter in the time-domain from the averaged impulse response and a target frequency response, including by including by solving a linear equation system to minimize an error between a target response for the loudspeaker and the averaged impulse response, wherein the error between the target response and the averaged impulse response is a mean square error $E_{MSE}$, having form $$E_{MSE} = \frac{1}{2\pi}\int_0^{2\pi} W(\omega)|P(e^{j\omega}) - H(e^{j\omega})G(e^{j\omega})|^2\, d\omega,$$

where $W(\omega)$ is a weighting function, $P(e^{j\omega})=P_R(\omega)e^{-j\omega g_d}$ is the target response, $P_R(\omega)$ is a zero phase function, $g_d$ is a group delay, frequency coefficients $H(e^{j\omega})$ determine a Fourier transform of the averaged impulse response, h(n), frequency coefficients $G(e^{j\omega})$ determine a Fourier transform of the inverse filter, and the mean square error, $E_{MSE}$, satisfies $$E_{MSE} = \sum_k \varepsilon^{(k)}(\omega_l, \omega_u),$$

where the loudspeaker has a full frequency range divided into k ranges, each from a lower frequency $\omega_j$ to an upper frequency $\omega_u$, and $\epsilon^k(\omega_j, \omega_u)$ is an error function for each of the ranges of form $$\varepsilon(\omega_l, \omega_u) = \frac{1}{\pi}\int_{\omega_l}^{\omega_u} W(\omega)|P(e^{j\omega}) - H(e^{j\omega})G(e^{j\omega})|^2 d\omega.$$

23. The method of claim 22, wherein the inverse filter has a full frequency range and the step of determining the inverse filter includes a step of employing closed form expressions to determine frequency segments of the full range of the inverse filter and transitions between neighboring ones of the frequency segments.

24. The method of claim 22, wherein the step of determining the inverse filter includes steps of:

determining the gradient of the mean square error, $E_{MSE}$, as $$\nabla E_{MSE} = (H^T PH + H^T P^T H)\, g - r^T H = 2H^T PHg - r^T H$$

where H is a matrix that determines the averaged impulse response, P is a symmetric matrix that determines the target response, g is a vector, $g=[g(0)\ g(1)\ g(2) \ldots g(L-1)]^T$, whose elements are coefficients g(n) of the inverse filter, and r is a vector that satisfies $$r = \frac{1}{\pi}\int_{\omega_l}^{\omega_u} W(\omega)P_R(\omega)c(\omega)d\omega; \text{ and}$$

determining the vector, g, that minimizes the mean square error by solving the linear equation system $$H^T PHg = \frac{1}{2} r^T H.$$

25. The method of claim 22, wherein the step of determining the inverse filter includes steps of:

determining the gradient of the mean square error, $E_{MSE}$, as $$\nabla E_{MSE} = (H^T PH + H^T P^T H) g - r^T H = 2H^T PHg - r^T H$$

where H is a matrix that determines the averaged impulse response, P is a symmetric matrix that determines the target response, g is a vector, $g=[g(0)\ g(1)\ g(2) \ldots g(L-1)]^T$, whose elements are coefficients g(n) of the inverse filter, and r is a vector that satisfies $$r = \frac{1}{\pi}\int_{\omega_l}^{\omega_u} W(\omega)P_R(\omega)c(\omega)d\omega;$$

and determining the vector, g, that minimizes the mean square error by solving the linear equation system $$A^{-1}Qg = \frac{1}{2}A^{-1}r^T H,$$

$$\text{where } H^T PHg = \frac{1}{2} r^T H,$$

Q is a matrix that satisfies $Q=H^T PH$, and A is a preconditioning matrix A that satisfies $A^{-1}Q \approx I$, where I is the identity matrix.

26. The method of claim 22, wherein the step of determining the inverse filter includes a step of performing local regularization on at least one critical frequency band of the inverse filter.

27. The method of claim 22, wherein the step of determining the inverse filter includes a step of performing local regularization on a critical frequency band-by-critical frequency band basis.

28. The method of claim 22, wherein the step of determining the inverse filter includes a step of normalizing the inverse filter against a reference signal.

29. The method of claim 22, wherein the step of determining the inverse filter includes a step of performing global regularization.

* * * * *